US007484087B2

(12) United States Patent
Doddington (10) Patent No.: US 7,484,087 B2
(45) Date of Patent: Jan. 27, 2009

(54) SYSTEMS, METHODS, AND SOFTWARE FOR PREVENTING REDUNDANT PROCESSING OF TRANSMISSIONS SENT TO A REMOTE HOST COMPUTER

(75) Inventor: Andrew Doddington, London (GB)

(73) Assignee: JP Morgan Chase Bank, New York, NY (US)

( * ) Notice: Subject to any disclaimer, the term of this patent is extended or adjusted under 35 U.S.C. 154(b) by 338 days.

(21) Appl. No.: 10/424,705

(22) Filed: Apr. 28, 2003

(65) Prior Publication Data

US 2004/0167878 A1   Aug. 26, 2004

Related U.S. Application Data

(60) Provisional application No. 60/449,378, filed on Feb. 24, 2003.

(51) Int. Cl.
*G06F 1/24* (2006.01)
(52) U.S. Cl. .................. 713/150; 713/156; 705/35; 709/217
(58) Field of Classification Search ............ 707/200, 707/202, 205; 713/150, 156; 705/35; 709/217
See application file for complete search history.

(56) References Cited

U.S. PATENT DOCUMENTS

| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,446,895 A | 8/1995 | White et al. |
| 5,539,885 A | 7/1996 | Ono et al. |
| 5,563,998 A | 10/1996 | Yaksich et al. |
| 5,566,297 A | 10/1996 | Devarakonda |
| 5,594,863 A | 1/1997 | Stiles |
| 5,630,047 A | 5/1997 | Wang |
| 5,630,069 A | 5/1997 | Flores et al. |

(Continued)

FOREIGN PATENT DOCUMENTS

WO    WO01/74043    10/2001

OTHER PUBLICATIONS

Agostini; A Light Workflow Management System Using Simple Process Models, Cooperation Technologies Laboratory, Disco-University of Milano-Bicoca ; Aug. 2000.

(Continued)

*Primary Examiner*—Tim T Vo
*Assistant Examiner*—Mahesh H Dwivedi
(74) *Attorney, Agent, or Firm*—Lowenstein Sandler PC (57) ABSTRACT

Systems, methods, and software that enable a remote host computer in receipt of a client transmission to reject subsequent redundant or duplicate transmissions from the client. The invention provides systems, methods, and software for attaching unique identifiers to transmissions sent to a client by a host computer. Upon sending the transmission with the attached unique identifier to the client, the host computer stores the unique identifier. The invention further provides methods, systems, and software for attaching the same unique identifier received by the client from the host computer to the particular client transmission that is responsive to the particular host computer transmission. Comparison of the unique identifier attached to the client transmission with stored unique identifiers allows the host computer to reject redundant transmissions.

51 Claims, 4 Drawing Sheets

U.S. PATENT DOCUMENTS

| | | | |
|---|---|---|---|
| 5,655,074 A | 8/1997 | Rauscher |
| 5,701,471 A | 12/1997 | Subramanyam |
| 5,712,971 A | 1/1998 | Stanfill et al. |
| 5,721,913 A | 2/1998 | Ackroff et al. |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell |
| 5,781,448 A | 7/1998 | Nakamura et al. |
| 5,799,297 A | 8/1998 | Goodridge et al. |
| 5,806,075 A | 9/1998 | Jain et al. |
| 5,828,883 A | 10/1998 | Hall |
| 5,835,770 A | 11/1998 | Shum et al. |
| 5,845,292 A | 12/1998 | Bohannon et al. |
| 5,872,976 A | 2/1999 | Yee et al. |
| 5,884,037 A | 3/1999 | Aras et al. |
| 5,903,897 A | 5/1999 | Carrier, III et al. |
| 5,920,719 A | 7/1999 | Sutton et al. |
| 5,937,198 A | 8/1999 | Nelson et al. |
| 5,960,196 A | 9/1999 | Carrier, III et al. |
| 5,960,445 A | 9/1999 | Tamori et al. |
| 6,003,075 A | 12/1999 | Arendt et al. |
| 6,009,274 A | 12/1999 | Fletcher et al. |
| 6,026,237 A | 2/2000 | Berry et al. |
| 6,028,938 A | 2/2000 | Malkin et al. |
| 6,029,002 A | 2/2000 | Afifi et al. |
| 6,058,393 A | 5/2000 | Meier et al. |
| 6,067,412 A | 5/2000 | Blake et al. |
| 6,073,107 A | 6/2000 | Minkiewicz et al. |
| 6,088,700 A | 7/2000 | Larsen et al. |
| 6,101,601 A | 8/2000 | Matthews et al. |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,195,676 B1 | 2/2001 | Spix et al. |
| 6,230,319 B1 | 5/2001 | Britt, Jr. et al. |
| 6,233,565 B1 * | 5/2001 | Lewis et al. .................. 705/35 |
| 6,237,035 B1 | 5/2001 | Himmel et al. |
| 6,237,143 B1 | 5/2001 | Fontana et al. |
| 6,243,862 B1 | 6/2001 | Lebow |
| 6,249,877 B1 | 6/2001 | Kawakami et al. |
| 6,269,479 B1 | 7/2001 | Puram |
| 6,279,039 B1 | 8/2001 | Bhat et al. |
| 6,301,701 B1 | 10/2001 | Walker et al. |
| 6,311,327 B1 | 10/2001 | O'Brien et al. |
| 6,363,499 B1 | 3/2002 | Delo et al. |
| 6,363,524 B1 | 3/2002 | Loy |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,438,749 B1 | 8/2002 | Chamberlain |
| 6,446,126 B1 | 9/2002 | Huang et al. |
| 6,463,454 B1 | 10/2002 | Lumelsky et al. |
| 6,466,980 B1 | 10/2002 | Lumelsky et al. |
| 6,467,052 B1 | 10/2002 | Kaler et al. |
| 6,470,464 B2 | 10/2002 | Bertram et al. |
| 6,477,471 B1 | 11/2002 | Hedstrom et al. |
| 6,502,207 B1 | 12/2002 | Itoh et al. |
| 6,505,176 B2 | 1/2003 | DeFrancesco, Jr. et al. |
| 6,513,154 B1 | 1/2003 | Porterfield |
| 6,519,763 B1 | 2/2003 | Kaufer et al. |
| 6,526,443 B1 | 2/2003 | Goldsmith et al. |
| 6,546,506 B1 | 4/2003 | Lewis |
| 6,560,580 B1 | 5/2003 | Fraser et al. |
| 6,578,004 B1 | 6/2003 | Cimral et al. |
| 6,578,006 B1 | 6/2003 | Saito et al. |
| 6,584,447 B1 | 6/2003 | Fox et al. |
| 6,587,841 B1 | 7/2003 | DeFrancesco et al. |
| 6,601,017 B1 | 7/2003 | Kennedy et al. |
| 6,601,018 B1 | 7/2003 | Logan |
| 6,601,233 B1 | 7/2003 | Underwood |
| 6,626,953 B2 | 9/2003 | Johndrew et al. |
| 6,629,266 B1 | 9/2003 | Harper et al. |
| 6,925,459 B2 * | 8/2005 | Cornell et al. .................. 707/3 |
| 7,197,568 B2 * | 3/2007 | Bourne et al. ............... 709/229 |
| 2002/0004912 A1 | 1/2002 | Fung |
| 2002/0007402 A1 * | 1/2002 | Huston et al. ............... 709/217 |
| 2002/0133593 A1 | 9/2002 | Johnson et al. |
| 2002/0133757 A1 | 9/2002 | Betram et al. |
| 2002/0138571 A1 | 9/2002 | Trinon et al. |
| 2002/0143929 A1 | 10/2002 | Maltz et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2003/0004848 A1 | 1/2003 | Hellerstein et al. |
| 2003/0018952 A1 | 1/2003 | Roetzheim |
| 2003/0033586 A1 | 2/2003 | Lawler |
| 2003/0041000 A1 | 2/2003 | Zajac et al. |
| 2003/0120539 A1 | 6/2003 | Korlum et al. |
| 2003/0144868 A1 | 7/2003 | MacIntyre et al. |
| 2003/0188290 A1 | 10/2003 | Corral |
| 2003/0196190 A1 | 10/2003 | Ruffolo et al. |
| 2003/0212518 A1 | 11/2003 | D'Alessandro et al. |
| 2003/0225662 A1 | 12/2003 | Horan et al. |
| 2003/0225663 A1 | 12/2003 | Horan et al. |
| 2004/0230572 A1 * | 11/2004 | Omoigui ........................ 707/3 |
| 2005/0071807 A1 | 3/2005 | Yanai |

OTHER PUBLICATIONS

Basili et al.; Understanding and Predicting the Process of Software Maintenance Releases; 18TH International Conference on Software Engineering (ICSE '96). Mar. 25, 1996; p. 464; (Abstract).

Code Generation for DB Applications; IBM Corporation; Mar. 1992; p. 1-3.

Duggan; 2.40 General; Feb. 1, 1974; SPI Database of Software Technologies; p. 1-5.

Georgakopoulos; An Overview of Workflow Management: From Process Modeling to Workflow Automation Infrastructure; Kluwer Academic Publishers, Boston; Distributed Parallel Databases 3; 1995; p. 119-153.

Hilbert; An Approach to Large Scale Collection of Application Usage Data Over the Internet, Software Engineering 1998; Proceedings of the 1998 International Conference; Apr. 19, 1998; Abstract.

Hudeponhl et al.; Integrating Metrics and Models for Software Risk Assessment; The Seventh International Symposium on Software Reliability Engineering (ISSRE '96); Oct. 30, 1996; p. 93.

Mohapatra et al.; Defect Prevention Through Defect Prediction: A Case Study at Infosys; IEEE International Conference on Software Maintenance (ICSM '01); Nov. 7, 2001; p. 260 (Abstract).

Muehlen;Business Process Modeling and Workflow Management; Association for Imaging Information Management (AIIM) and Gartner Group; p. 1-18.

Business Process Automation and Workflow in the Financial Industry; CSK Software AG; Version 3; Sep. 10, 2003; p. 1-37.

OS/2EE Database; Manager SQLJRA Rmote Protocol;IBM Corporation; IBM TDB N101-93; Jan. 1993; p. 33-36.

Quantitative Monitoring of Software Development by Time-Based and Intercheckpoint Monitoring; Software Engineering Journal; Jan. 1990; p. 43-49; vol. 5, ISS. 1; Abstract.

Sammet; Beginning of 4.6 Software Evaluation, Tests and Measurements and RMF I/O Time Validation; Association; Association for Computing Machinery; Nov. 1, 1981; p. 519.

Wohlin et al.; Understanding the Sources of Software Defects; A Filtering Approach; 8TH International Workshop on Program Comprehension (IWPC '00); Jun. 10, 2000; p. 9; Abstract.

* cited by examiner

SYSTEMS, METHODS, AND SOFTWARE FOR PREVENTING REDUNDANT PROCESSING OF TRANSMISSIONS SENT TO A REMOTE HOST COMPUTER

This application claims the benefit of U.S. Provisional Application No. 60/449,378, filed Feb. 24, 2003, entitled Systems, Methods, And Software For Preventing Redundant Processing Of Transmissions Sent To A Remote Host Computer, by Andrew Doddington, which application is hereby incorporated herein by reference.

1. FIELD

The invention is directed to systems, methods, and software for preventing a remote host computer (for example, a network-based computer or Internet server) from processing redundant client transmissions.

2. BACKGROUND

Erroneous results may arise when users, operating remote computers running network-based applications, submit the same request transmission to a host computer multiple times. This often happens when a client operating a remote computer running a web-based application, submits requests to Internet servers. Long response times by the Internet server, due to network delays or other performance issues, encourage clients to make such multiple, redundant submissions. Examples where redundant request transmission are often submitted to Internet-based servers are operations that comprise editing data structures, submitting payments, or other incremental changes to an object.

Merchants and other providers and are increasingly operating web-based platforms on Internet servers to sell goods, execute financial-instrument trades, and conduct other transactions. A common platform is one that allows a client to place goods in a virtual "shopping cart". Then, when the client is prepared to finalize the purchase, he proceeds to a virtual "checkout". At this stage, all items in the client's shopping cart and total amount due are displayed along with the client's credit card or other payment information. The client then clicks on a "submit", "pay", or "buy" button displayed on the web page thereby executing the transaction to purchase the goods.

If precautions are not taken, the client's order may be inadvertently submitted twice. For example, if the client clicks the submit button, then reloads the page, the information may be re-submitted, causing the order to be entered twice. Or, if the client does not receive a confirmation of the purchase in a timely manner, he may hit the "pay" button again in frustration, thereby executing a duplicate purchase. Such redundant transmissions result in great inconvenience to the client, who has to return the unwanted goods and seek a refund for the duplicate order. The problem is sufficiently common that payment services frequently warn clients against pressing the 'Pay' button twice, since this may result in multiple payment transactions being performed by the server and client over billing.

What is needed are systems, methods, and software for preventing computers from processing redundant client transmissions sent from remote computers. Such systems, methods, and software would benefit clients, online merchants, and traders by, among other things, preventing unintended duplicate orders.

3. SUMMARY

The invention provides systems, methods, and software that enable a remote computer in receipt of a client transmission from a computer or computer workstation to reject subsequent redundant or duplicate transmissions from the client.

In one embodiment, the invention provides unique identifiers for transmissions sent to a client by a host computer. Preferably, the host computer is a network-based computer or an Internet server and the client is a remote computer such as a personal computer operated by a user. Preferably, transmissions sent by the host computer are interfaces. As used herein, the term "interface" means a displayed or transmitted, user-friendly set of pictures, graphics, text, or voice statements that provide instructions and protocols indicating how a user is to communicate and interact with a platform, for example, web pages and voice pages. Upon sending the transmission with the attached unique identifier to the client, the host computer stores the unique identifier, for example, in a database.

In another embodiment, the invention attaches the same unique identifier received by the client from the host computer to the particular client transmission that is responsive to the particular host computer transmission. Preferably, the responsive client transmissions are named data values corresponding to user input data or actions.

When the host computer receives such a client transmission, it compares the unique identifier attached to the client transmission with stored unique identifiers. If the unique identifier attached to the client transmission matches a unique identifier stored by the host computer, the host computer will: (1) accept and process the client transmission as appropriate; and, at the same time (2) reset the stored unique identifier corresponding to the original host transmission, for example, to a null or void value. Now, according to one advantageous aspect of the invention, if the client erroneously resends the responsive transmission, as soon as the host computer compares the unique identifier attached to the such a transmission with the stored value corresponding to the original host transmission, which is now null or void, there will not be a match. Upon determining the mismatch, the host computer will reject the transmission as redundant. Advantageously, a host computer according to the invention processes only the original client transmission and rejects subsequent redundant transmissions. Thus, for example, the client is not billed multiple times by sending redundant buy requests over the Internet to a web-based sales platform.

4. BRIEF DESCRIPTION OF THE FIGURES

These and other features, aspects, and advantages of the present invention will become better understood with regard to the following description, appended claims, and accompanying Figures where:

5. DETAILED DESCRIPTION

Any approach, well known to those of skill in the art, can be used to incorporate the unique identifier of the invention into transmissions (e.g., interfaces, such as web pages) between remote computers. For example, the unique identifier can be stored in a hidden input field or embedded in a web page URL. Preferably, an input field containing the unique identifier is hidden from users, for example, in a hidden HTML input field. But this is not essential for practice of the invention, and the unique identifier can be visible to the user, for example, it can be displayed on a web page as text or audio.

In one embodiment, the unique identifier of the invention comprises: (1) a "session identifier" so that the host computer can correlate the client's transmission to the particular client session; and (2) a "transmission-set identifier", which is unique to each transmission set. A "transmission set" means: (a) a transmission sent by the host computer to the client the "host transmission"; and (b) the client's response to that particular transmission the "response transmission". Preferably, the session identifier remains constant throughout the session, and a new transmission-set identifier is generated in a pseudo-random or random manner for each host transmission. Since the transmission-set identifier is generated using a randomized mechanism, historical values do not need to be retained. The use of a random value, rather than a simple incrementing value, also greatly reduces the risk of a mischievous user from simulating a correct input. This is because: (a) It is not practicable for such a user to guess what the key should be; and (b) Once a key has been used once, it is no longer usable. Accordingly, each host transmission of a particular session is considered the first part of a new transmission set and will receive a new transmission-set identifier but the same session identifier. Preferably, the host transmission is an interface such as a web page and the response transmission comprises data fields generated by client upon interacting and responding to the interface.

In one embodiment, the session identifier is a name parameter and the transmission-set identifier is a value parameter. Thus, the unique identifier is represented as a "name parameter"/"value parameter" pair. The name parameter and the value parameter can be incorporated in an input field in the host transmission and in the response transmission. The "name parameter" portion of the unique identifier can be derived by applying a transformation to some detail that is held by the host computer and that is specific to a particular session of a particular client. The value parameter can be a pseudo-random value that is calculated each time a new transmission is generated by the host computer. Since a randomized mechanism is used, historical values do not need to be retained.

In one embodiment of the invention, whenever the host computer (preferably, a network-based computer, such as an Internet server) receives a transmission from a client, the host computer will query for the unique identifier of the invention (e.g., a "session identifier"/"transmission-set identifier" pair, such as a "name parameter"/"value parameter" pair as discussed above) and compare that unique identifier to stored unique identifiers. Then, four possibilities exist.

(1) If the host computer does not recognize the session identifier attached to the client transmission (i.e., the attached session identifier does not match a stored session identifier), it will reject the client transmission. Such a client is not in a valid session. Preferably, an error message is returned to the client, for example, displayed on the client's computer screen.

(2) If the host computer recognizes the session identifier attached to the client transmission, and the transmission-set identifier attached to the client transmission matches the value stored by the host computer, then the transmission-set identifier is reset (e.g., to a null or otherwise invalid state) and the client transmission is processed.

(3) If the host computer identifies the session identifier, but the transmission-set identifier held on the server is null/invalid, this means that the client has submitted a request while an earlier request is still being processed, i.e., a redundant request. The host computer's response will vary depending on the application, the simplest option being to ignore the redundant client transmission and/or send an error message.

(4) If the host computer identifies the session identifier, but the transmission-set identifier does not match the value stored by the host computer (which is non-null), then the client has submitted a request that does not correspond to a host transmission (i.e., is not part of a transmission set). The host computer's response will vary depending on the application. One option is to ignore the request and/or send an error message.

Figure 1:
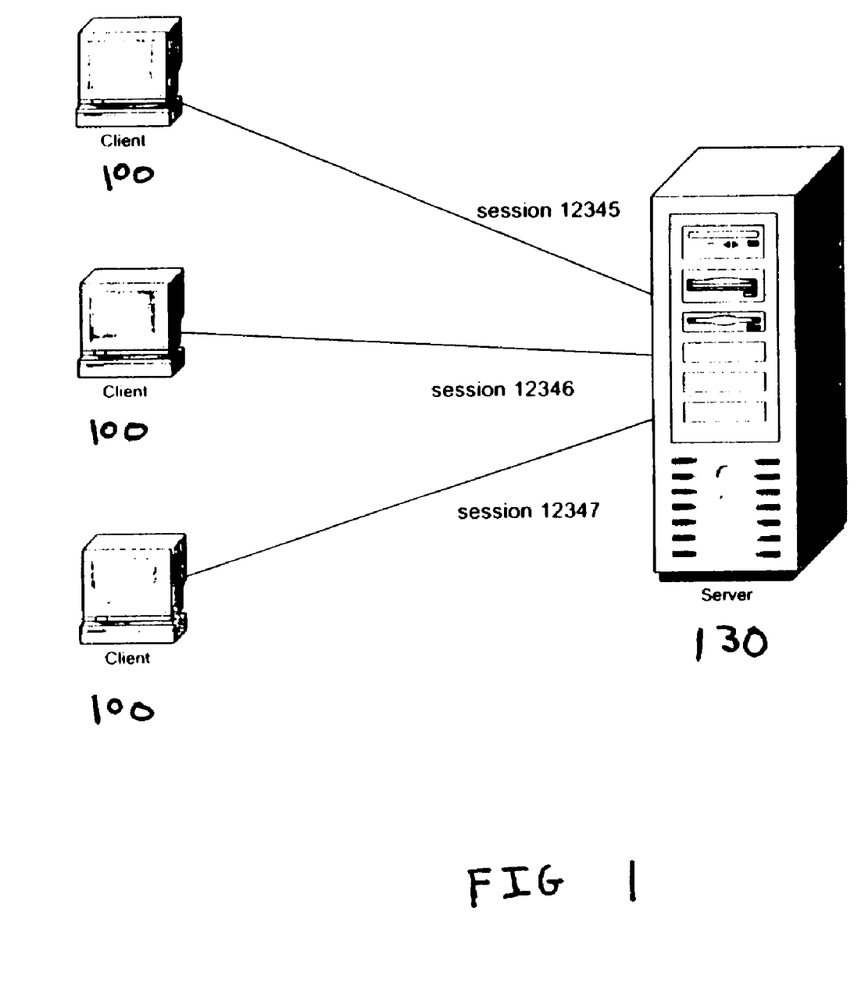
FIGS. 1 and 2 are an illustrations of systems where the methods and software of the invention can be implemented.

FIGS. 1-4 show a specific embodiment of the invention. In FIG. 1, one or more remote clients 100 (e.g., users operating computer workstations or personal computers) are each involved in a single session with central station 130 (i.e., the session identifiers 12345, 12346, and 12347). Preferably, central station 130 is a computer located on a network, such as an Internet server. Remotely located clients 100 can communicate with central station 130 over a network, such as the Internet, or clients 100 can be directly linked to central station 130. A session is where a client initiates a connection to a server and then performs a series of interactions with the server, typically for the purpose of conducting one or more business transactions. The session may be terminated in a number of ways, for example by the user explicitly terminating it (e.g., by "logging off"). Or it may be terminated by the server if the user ceases interacting with the server for some period of time. Examples or sessions include interacting with a web site such as amazon.com to purchase one or more books. Of course, clients 100 may be involved in multiple sessions with central station 130 or with other servers or stations in addition to central station 130.

Figure 2:
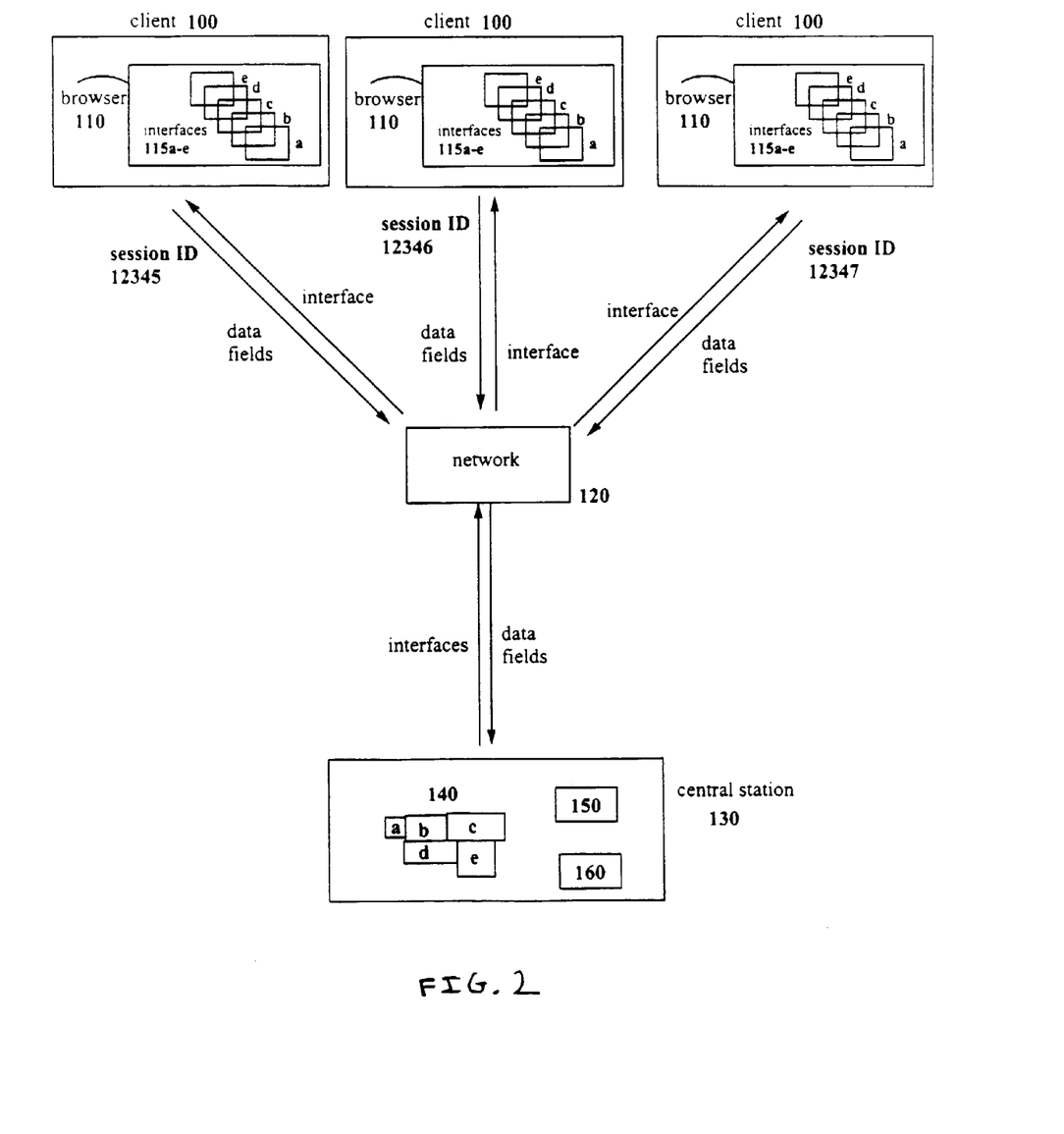

In the specific embodiment shown in FIG. 2, each client 100 runs a browser or some other suitably enabled application or computer program 110 to communicate with central station 130 through network 120. During a session, each client 100 will request one or more interfaces 115, such as web pages, from central station 130. When central station 130 receives a request for an interface, it will send the requested interface across network 120 to the requesting browser 110. Browser 110 will render interface 115 to permit the user to interact with it.

Preferably, interface 115 comprises a web page, central station 130 is an Internet-based web server, and network 120 is the Internet. The Internet's entire system of web pages with links to other web pages on other servers across the world is known as the "World Wide Web". A web page may contain various types of data, including text, graphics and other forms of information. Most web pages include visual data that is intended to be displayed on the monitor of a client workstation. Web pages are generally written in Hypertext Markup Language (HTML), eXtensible Markup Language (XML), or as JAVA-server pages (.jsp files). Web pages are generated by web servers and rendered by a browser application running on clients 100. Each web server on the Internet has an address, termed the Uniform Resource Locator (URL), which the web browser uses to connect to the appropriate web server. Because central station 130 can contain more than one web page, the user will specify the address of the desired web page. In a preferred embodiment, central station 130 runs computer software applications 140, monitors and responds to client transmissions (e.g., requests for web pages), and services requests for which it has responsibility. When a client-transmission request specifies a URL address of central station 130, applications 140 generally accesses the web page corresponding to the specific request, and transmit the web page to the web browser 110 on client workstation 100. Preferably, Browser 110 understands HTML, XML, and JAVA and interprets and renders the interface on the user's monitor (or other display or communication means) of clients 100. Preferred web browsers include Netscape Communicator and Microsoft Internet Explorer.

An interface can contain any suitable HTML data, including text, graphics, audio elements, video elements, and links (which reference URL addresses of other interfaces). The user can access other interfaces by selecting these links using a computer mouse or other input means including, but not limited to, telephone buttons or voice commands.

To begin a session, the user opens a browser application at client station 100 and sends an interface-request transmission to central station 130. For example, the user might desire to purchase a book and accesses a platform hosted by amazon.com. Central station 130 responds by providing one or more interfaces 115. Throughout the session, the user interacts with each individual interface. Each time the user interacts with a particular interface, for example, by clicking with a computer mouse, he transmits bundles of data fields, specific to that particular interface, to instruct one or more applications 140a-e running on central station 130.

According to the invention, each interface 115 provided by central station 130 comprises a unique identifier. Preferably, the unique identifier is contained in a hidden input field. Preferably, the unique identifier comprises: (1) a session identifier so that central station 130 can correlate the client's transmitted data fields with the particular session in which the client is involved; and (2) a transmission-set identifier, which correlates client data fields with the particular interface to which they are responsive. Preferably, the session identifier remains constant throughout the session, and the transmission-set identifier is recalculated with each new interface transmission sent by central station 130 to client 100.

Figure 3:
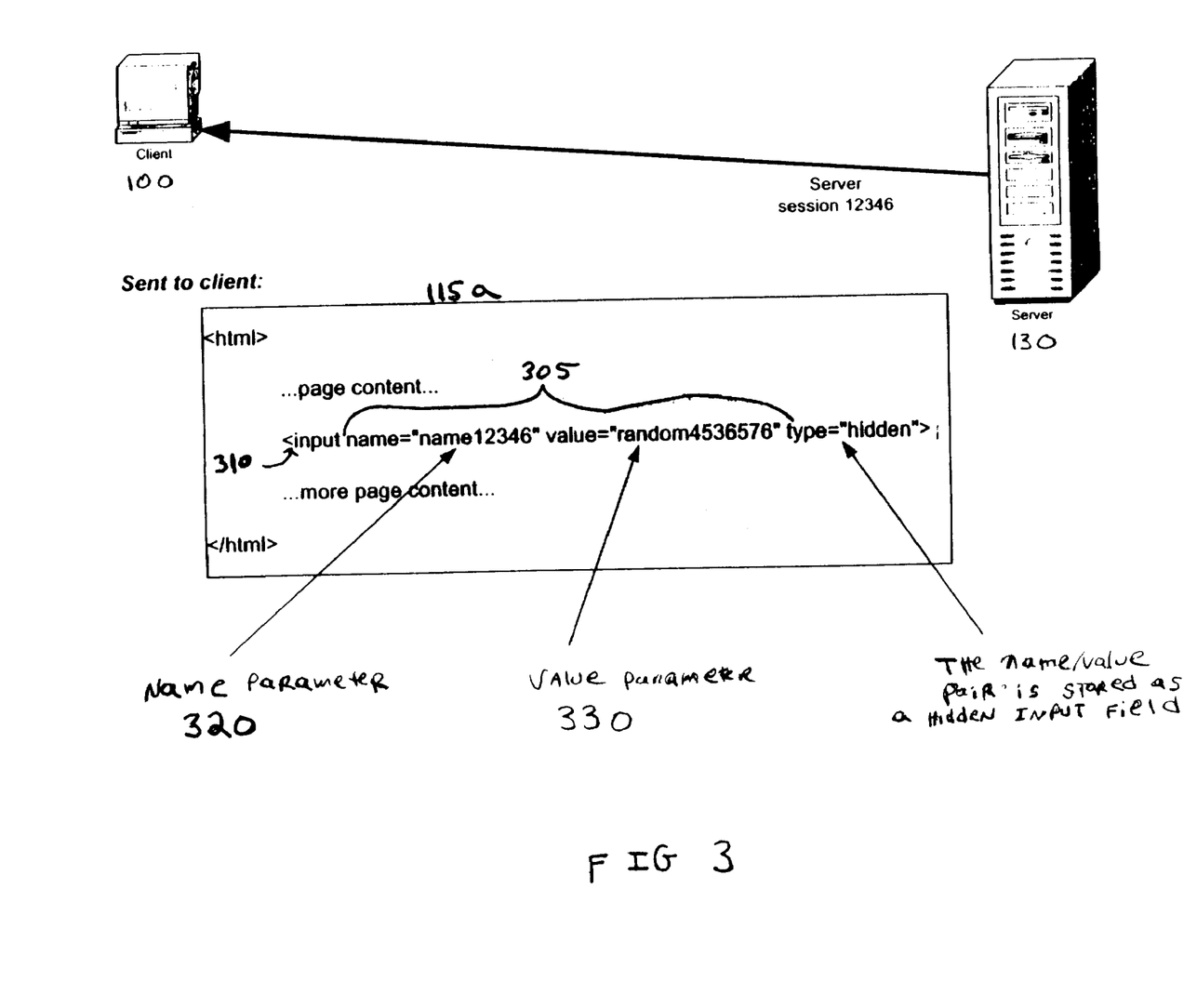
FIG. 3 is an illustration of a server transmitting a web page comprising a unique identifier of the invention to a client.

FIG. 3 focuses on session 12346, which for purposes of example is a web-based session, wherein client 100 receives web page 115a from server 130. Web page 115a contains various HTML code indicated by the phrase "... page content ..." and "... more page content..." for rendering the page on the client screen and providing an interface for the user. Web page 115a further comprises hidden identification input field 310 comprising unique identifier 305 consisting of name parameter 320 and value parameter 330. Name parameter 320 identifies the session, in this case, session 12346. Value parameter 330 identifies the particular web page (i.e., web page 115a). According to the invention, both name parameter 320 and value parameter 330 are stored by server 130 in a variable located in database 160 (FIG. 2).

Throughout session 12346, each time server 130 generates a web page, it incorporates the same name parameter 320 (i.e., "name12346") in input field 310. In a preferred embodiment, name parameter 320 is derived by applying a transformation to some detail that is held by server 130, which is specific to client 100. For example, the name parameter can be derived by converting the JAVA HTTP session identifier, which is managed by the standard JAVA 2 Enterprise Edition (J2EE) framework. More specifically, the name parameter can be a string generated by eliminating characters that are not used in the HTML input field name of the session ID provided by the JAVA HTTP session object. An example of JAVA code that could perform this operation is shown below.

```
----------------------- START OF JAVA CODE
    // Note 'session' is an HttpSession object, obtained from the
        servlet container, in
which the software is executing
    String      id = session.getId( );      // get the session 'id'
    StringBuffer rslt = new StringBuffer( ); // a buffer to hold the
        resulting name-value
    // strip out invalid chars from the id
    for (int i = 0; i < id.length( ); i++)
    {     char ch = id.charAt(i);
        if ((i == 0 && Character.isJavaIdentifierStart(ch))
          || Character.isJavaIdentifierPart(ch))
              { rslt.append(ch); // add the char if valid    }    }
----------------------- END OF JAVA CODE
```

Using a name parameter based on the session ID is advantageous because the JAVA servlet framework stores it. Alternative methods of generating name parameters may require separate means of storage. Such storage is well known in the art, for example, by using the JAVA HttpSession method 'setAttribute'.

Preferably, value parameter 330 is a pseudo-random or random value that is calculated each time a new page is generated by server 130. Since the transmission-set identifier and/or value parameter is generated using a randomized mechanism, historical values do not need to be retained. The use of a random value, rather than a simple incrementing value, also greatly reduces the risk of a mischievous user from simulating a correct input. This is because: (a) It is not practicable for such a user to guess what the key should be; and (b) Once a key has been used once, it is no longer usable. For example, referring to FIG. 2, each of the five pages 115a-115e would have a different value parameter 330a-330e but the same name parameter 320. As illustrated in FIG. 3 by web page 115a and in FIG. 4 by data field 400, the value parameter for web page 115a is "random4536576". The value parameter is stored during the session, for example, using a predefined attribute of the J2EE session variable. For example, the random value could be stored in a session attribute named "RANDOM_TEXT" using the JAVA code shown below.

```
        START OF JAVA CODE
    // assume that the current session's random value is held in
the variable "currentRandom". The variable
    // "session" is a reference to the current HttpSession object,
provided by the servlet environment.
    // Save the value in the session so that it can be recovered
when the user submits their response.
    session.setAttribute("RANDOM_TEXT", currentRandom);
        END OF JAVA CODE
```

Generation of pseudo-random or random values is well known in the art. A classic text on the subject is 2 DONALD KNUTH, THE ART OF COMPUTER PROGRAMMING, SEMINUMERICAL ALGORITHMS (2nd ed. 1981), which is hereby incorporated herein by reference. One way to generate a pseudo-random value is to use the standard JAVA library to generate a pseudo-random value and to then convert this to a string.

An example of JAVA code that could perform this operation is shown below.

```
----------------------- START OF JAVA CODE
    Random randomSource = new Random( ); // do this once e.g. at
    system startup
    // do this each time a new random value is required,
    // i.e. generate a random long integer and convert it to a string form
    String randomValue = String.valueOf(randomSource.nextLong( ));
----------------------- END OF JAVA CODE
```

Figure 4:
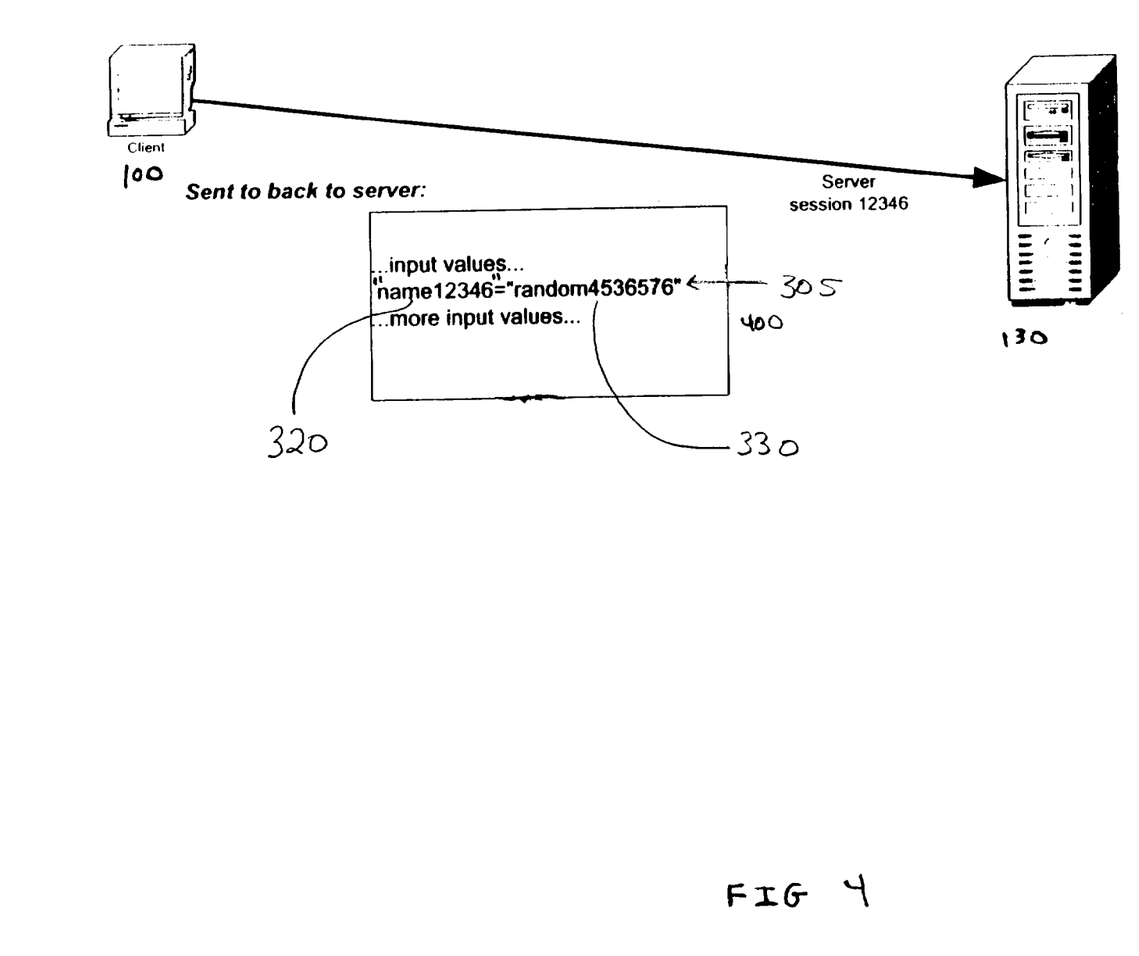
FIG. 4 is an illustration of a client transmitting data fields comprising a unique identifier of the invention back to the server.

As illustrated by FIG. 4, client 100 interacts with web page 115a and transmits data field 400 back to server 130 to direct and control particular applications 140 (FIG. 2) running on server 130 in session 12346. As further illustrated by FIG. 4, the software of the invention attaches the unique identifier 305 (in this case "name12346"="random4536576") to data field 400. The functionality to return the data field and its value (for example, provided as a hidden input field) is normally a function of the browser application. Typically, the user submits the interface by pressing a button on the display. This then causes all input fields in the interface to be returned to the server; including the hidden field of the invention.

When server 130 receives data field 400 transmitted by client 100, the software of the invention 150 (FIG. 2) queries to analyze unique identifier 305 and identify name parameter 320 and its associated value parameter 330. The software of the invention 150 running on server 130 compares name parameter 320 and value parameter 330 to the original values stored for web page 115a in database 160 and will instantly recognize that data field 400 corresponds to web page 115a of session 12346. Software of the invention 150 will then instruct server 130 to process data field 400 and will also reset the "value parameter" associated with web page 115a, held in database 160, to a null or otherwise invalid state. Any subsequent web page sent back to client 100 for session 12346 will contain a new unique identifier comprising the same name parameter or session identifier (i.e., "name 12346") and a new transmission-set identifier (e.g., a newly generated pseudo-random value parameter). For example, in session 12346, should server 130 transmit web page 115b to client 100, the software of the invention could attached the following hidden input field:

<input name="name12346" value="random984987"
    type="hidden">

5.1 Definitions

As used herein, the term "network" means any system of two or more interconnected computers. Examples of networks include, but are not limited to, the Internet and other Wide Area Networks (WANs), and Local Area Networks (LANs).

A preferred network for use in the invention is the Internet. When capitalized, the term "Internet" refers to the collection of computers, computer networks, and gateways that use TCP/IP protocols. Internet resources for transferring information include File Transfer Protocol (FTP) and Gopher. But preferably, information is transmitted and received over the Internet by way of the World Wide Web. The World Wide Web is the collection of servers and computers that use Hypertext Transfer Protocol (HTTP) for transferring data files. Clients interact with the World Wide Web through web pages, which are logical blocks of information typically formatted with Hypertext Markup Language (HTML) or eXtensible Markup Language (XML). Web pages are identified by a Uniform Resource Locator ("URL"), which is a special syntax identifier (network address) defining a communications path to the web page.

A browser is a program capable of submitting a request for a web page identified by a URL. Retrieval of web pages is generally accomplished with an HTML- or XML-compatible browser that browses web sites. A web site is a group of related HTML documents and associated files, scripts, and databases that is served up by an HTTP server on the World Wide Web.

As used herein, the phrase "network connection" means any channel by which a person, party, or business entity can interface or communicate with a network. Examples of network connections include, but are not limited to, telephone lines by way of internal or external modems, digital subscriber lines ("DSL"), connections to voice mail and voice pages; dedicated data lines; cellular phone communication; communication by way of satellite; and cable television lines.

As used herein, the term "platform" means a system of software and hardware located on a network that performs a function, such as providing services or information, and which is accessible through a network interface from a requesting computer. A typical platform for use in the invention comprises a database of various data tables and server engine, which receives HTTP requests to access the platform's web pages identified by Uniform Resource Locator ("URL") and provides the web pages as an interface to a requesting computer.

5.2 Conclusion

In view of the above Background, Summary, Figures, and Detailed Description, it is clear that in certain embodiments, the invention comprises a method of preventing a remote host-computer from processing a redundant client transmission comprising:

(a) initiating a session between the host-computer and a client;

(b) attaching a first unique identifier to a host-computer transmission, wherein the unique identifier comprises a session identifier and a transmission-set identifier;

(c) the host-computer performing the step of storing the first unique identifier to create a stored unique identifier;

(d) the host-computer performing the step of sending the host-computer transmission to the client;

(e) the client performing the step of attaching the first unique identifier to a client transmission that is responsive to the host-computer transmission;

(f) the client performing the step of sending the responsive client transmission to the host-computer;

(g) the host-computer performing the step of querying the responsive client transmission for the first unique identifier and comparing it to the stored unique identifier.

In another embodiment, the invention comprises a system for preventing a remote host-computer from processing a redundant client transmission comprising a remote host-computer and a client, wherein each of the client and the remote host-computer comprise:

(i) a client memory-storage device and a host-computer memory-storage device;

(ii) a client processor and a host-computer processor connected to the respective storage devices; and (iii) client software and host-computer software for controlling the respective processors, wherein the memory-storage devices and the processors are operative with the software to:

(a) initiate a session between the host-computer and the client;

(b) attach a first unique identifier to a host-computer transmission, wherein the unique identifier comprises a session identifier and a transmission-set identifier;

(c) store the first unique identifier in the host-computer memory-storage device to create a stored unique identifier;

(d) send the host-computer transmission to the client;

(e) attach the first unique identifier to a client transmission that is responsive to the host-computer transmission;

(f) send the responsive client transmission to the host-computer;

(g) query the responsive client transmission for the first unique identifier and comparing it to the stored unique identifier.

In one more embodiment, the invention comprises a computer-readable medium programmed with software that is operative to cause a host-computer comprising a memory-storage device and a processor to:

(a) attach a first unique identifier to a host-computer transmission, wherein the unique identifier comprises a session identifier and a transmission-set identifier;

(b) store the first unique identifier in the memory storage device to create a stored unique identifier;

(c) send the host-computer transmission to a client;

(d) query a responsive client transmission for the first unique identifier and compare it to the stored unique identifier.

In still another embodiment, the invention comprises a computer-readable medium programmed with software that is operative to cause a client comprising a memory-storage device and a processor to:

(a) initiate a session between the client and a host computer;

(b) attach a first unique identifier to a client transmission that is responsive to a host-computer transmission, wherein the unique identifier comprises a session identifier and a transmission-set identifier; and (c) send the responsive client transmission to the host-computer.

Although the present invention has been described in considerable detail with reference to certain preferred embodiments and versions, other versions and embodiments are readily implemented by those of skill in the art. Therefore, the scope of the appended claims should not be limited to the description of the versions and embodiments expressly disclosed herein.

What is claimed is:

1. A method of preventing a remote host-computer from processing a redundant client transmission comprising:

(a) initiating a session between the host-computer and a client;

(b) attaching a first unique identifier to a host-computer transmission, wherein the first unique identifier comprises a first session identifier and a first transmission-set identifier, said session identifier is a constant value for correlating a client transmission to the client session and said transmission-set identifier is a changeable value unique to each transmission set between the host-computer and the client;

(c) the host-computer performing the step of storing the first unique identifier to create a stored unique identifier comprising a stored session identifier and a stored transmission-set identifier;

(d) the host-computer performing the step of sending the host-computer transmission to the client;

(e) the client performing the step of attaching the first unique identifier to a client transmission that is responsive to the host-computer transmission;

(f) the client performing the step of sending the responsive client transmission to the host-computer;

(g) the host-computer performing the step of querying the responsive client transmission for the first unique identifier and comparing it to the stored unique identifier; and (h) the host-computer performing the step of rejecting the responsive client transmission by one of ignoring the transmission or sending an error message upon no match between the first unique identifier and the stored unique identifier, wherein said rejecting is based on at least one of a redundant request for the client transmission sent by the client such that the host computer identifies a match between the stored session identifier and the first session identifier and the first transmission-set identifier is null/invalid, and on the client transmission sent by the client that does not correspond to the host-computer transmission such that the host computer identifies a match between the stored session identifier and the first session identifier and does not identify a match between the stored transmission-set identifier and the first transmission-set identifier.

2. The method of claim 1, further comprising processing the responsive client transmission upon a match between the first unique identifier and the stored identifier.

3. The method of claim 1, further comprising the host-computer performing the step of changing the identity of the stored unique identifier upon receiving the responsive client transmission.

4. The method of claim 3, wherein changing the identity of the stored unique identifier comprises setting the first transmission-set identifier to a null or void value.

5. The method of claim 1, wherein the first session identifier comprises a name parameter and the first transmission-set identifier comprises a value parameter.

6. The method of claim 5, wherein the name parameter is derived by applying a transformation to some detail that is held by the host-computer and that is specific to the session.

7. The method of claim 5, wherein the value parameter comprises a pseudo-random value or random value.

8. The method of claim 1, wherein the host-computer transmission comprises a web page.

9. The method of claim 1, wherein the responsive client transmission comprises a data field.

10. The method of claim 1, wherein an input field comprises the first unique identifier.

11. The method of claim 1, further comprising the step of generating a new first transmission-set identifier in a random or pseudo-random manner for each successive host-computer transmission, wherein the first session identifier remains constant throughout the session.

12. The method of claim 1, wherein the host-computer comprises a network-based computer or workstation.

13. The method of claim 1, wherein the host-computer comprises an Internet server.

14. A system for preventing a remote host-computer from processing a redundant client transmission comprising a remote host-computer and a client, wherein each of the client and the remote host-computer comprise:

(i) a client memory-storage device and a host-computer memory-storage device;

(ii) a client processor and a host-computer processor connected to the respective storage devices; and (iii) client software and host-computer software for controlling the respective processors, wherein the memory-storage devices and the processors are operative with the software to:
- (a) initiate a session between the host-computer and the client;
- (b) attach a first unique identifier to a host-computer transmission, wherein the unique identifier comprises a first session identifier and a first transmission-set identifier, said session identifier is a constant value for correlating a client transmission to the client session and said transmission-set identifier is a changeable value unique to each transmission set between the host-computer and the client;
- (c) store the first unique identifier in the host-computer memory-storage device to create a stored unique identifier, wherein said stored unique identifier comprises a stored session identifier and a stored transmission-set identifier;
- (d) send the host-computer transmission to the client;
- (e) attach the first unique identifier to a client transmission that is responsive to the host-computer transmission;
- (f) send the responsive client transmission to the host-computer;
- (g) query the responsive client transmission for the first unique identifier and comparing it to the stored unique identifier; and
- (h) reject the responsive client transmission by one of ignoring the transmission or sending an error message upon no match between the first unique identifier and the stored unique identifier, wherein said reject is based on at least one of a redundant request for the client transmission sent by the client such that the host computer identifies a match between the stored session identifier and the first session identifier and the first transmission-set identifier is null/invalid, and on the client transmission sent by the client that does not correspond to the host-computer transmission such that the host computer identifies a match between the stored session identifier and the first session identifier and does not identify a match between the stored transmission-set identifier and the first transmission-set identifier.

15. The system of claim 14, wherein the memory-storage devices and the processors are further operative with the software to process the responsive client transmission upon a match between the first unique identifier and the stored identifier.

16. The system of claim 14, wherein the memory-storage devices and the processors are further operative with the software to change the identity of the stored unique identifier upon receipt of the responsive client transmission.

17. The system of claim 16, wherein changing the identity of the stored unique identifier comprises setting the first transmission-set identifier to a null or void value.

18. The system of claim 14, wherein the first session identifier comprises a name parameter and the transmission-set identifier comprises a value parameter.

19. The system of claim 18, wherein the name parameter is derived by applying a transformation to some detail that is held by the host-computer and that is specific to the session.

20. The system of claim 18, wherein the value parameter comprises a pseudo-random value or a random value.

21. The system of claim 14, wherein the host-computer transmission comprises a web page.

22. The system of claim 14, wherein the responsive client transmission comprises a data field.

23. The system of claim 14, wherein an input field comprises the unique identifier.

24. The system of claim 14, wherein the memory-storage devices and the processors are further operative with the software to generate a new first transmission-set identifier in a pseudo-random or random manner for each successive host-computer transmission, wherein the first session identifier remains constant throughout the session.

25. The system of claim 14, wherein the host-computer comprises a network-based computer or workstation.

26. The system of claim 14, wherein the host-computer comprises an Internet server.

27. A computer-readable medium programmed with software that is operative to cause a host-computer comprising a memory-storage device and a processor to:
- (a) attach a first unique identifier to a host-computer transmission, wherein the unique identifier comprises a first session identifier and a first transmission-set identifier, said session identifier is a constant value for correlating a client transmission to the client session and said transmission-set identifier is a changeable value unique to each transmission set between the host-computer and the client;
- (b) store the first unique identifier in the memory storage device to create a stored unique identifier, wherein said stored unique identifier comprises a stored session identifier and a stored transmission-set identifier;
- (c) send the host-computer transmission to a client;
- (d) query a responsive client transmission for the first unique identifier and compare it to the stored unique identifier; and
- (e) reject the responsive client transmission by one of ignore the transmission or send an error message upon no match between the first unique identifier and the stored unique identifier, wherein said reject is based on at least one of a redundant request for the client transmission sent by the client such that the host computer identifies a match between the stored session identifier and the first session identifier and the first transmission-set identifier is null/invalid, and on the client transmission sent by the client that does not correspond to the host-computer transmission such that the host computer identifies a match between the stored session identifier and the first session identifier and does not identify a match between the stored transmission-set identifier and the first transmission-set identifier.

28. The computer-readable medium of claim 27, comprising a hard drive, a CD disk, or a floppy disk.

29. The computer-readable medium of claim 27, wherein the memory-storage device and the processor are further operative with the software to process the responsive client transmission upon a match between the first unique identifier and the stored identifier.

30. The computer-readable medium of claim 27, wherein the memory-storage device and the processor are further operative with the software to change the identity of the stored unique identifier upon receipt of the responsive client transmission.

31. The computer-readable medium of claim 30, wherein changing the identity of the stored unique identifier comprises setting the first transmission-set identifier to a null or void value.

32. The computer-readable medium of claim 27, wherein the first session identifier comprises a name parameter and the first transmission-set identifier comprises a value parameter.

33. The computer-readable medium of claim 32, wherein the name parameter is derived by applying a transformation to some detail that is held by the host-computer and that is specific to the session.

34. The computer-readable medium of claim 32, wherein the value parameter comprises a pseudo-random value or a random value.

35. The computer-readable medium of claim 27, wherein the host-computer transmission comprises a web page.

36. The computer-readable medium of claim 27, wherein the responsive client transmission comprises a data field.

37. The computer-readable medium of claim 27, wherein an input field comprises the unique identifier.

38. The computer-readable medium of claim 27, wherein the memory-storage device and the processor are further operative with the software to generate a new first transmission-set identifier in a pseudo-random or random manner for each successive host-computer transmission, wherein the first session identifier remains constant throughout the session.

39. The computer-readable medium of claim 27, wherein the host-computer comprises a network-based computer or workstation.

40. The computer-readable medium of claim 27, wherein the host-computer comprises an Internet server.

41. A computer-readable medium programmed with software that is operative to cause a client comprising a memory-storage device and a processor to:
  (a) initiate a session between the client and a host computer;
  (b) attach a first unique identifier to a client transmission that is responsive to a host-computer transmission, wherein the first unique identifier comprises a first session identifier and a first transmission-set identifier, said session identifier is a constant value for correlating a client transmission to the client session and said transmission-set identifier is a changeable value unique to each transmission set between the host-computer and the client;
  (c) send the responsive client transmission to the host-computer;
  (d) query the responsive client transmission for the first unique identifier and compare it to a stored unique identifier, wherein said stored unique identifier comprises a stored session identifier and a stored transmission-set identifier; and
  (e) reject the responsive client transmission by one of ignore the transmission or send an error message upon no match between the first unique identifier and the stored unique identifier, wherein said reject is based on at least one of a redundant request for the client transmission sent by the client such that the host computer identifies a match between the stored session identifier and the first session identifier and the first transmission-set identifier is null/invalid, and on the client transmission sent by the client that does not correspond to the host-computer transmission such that the host computer identifies a match between the stored session identifier and the first session identifier and does not identify a match between the stored transmission-set identifier and the first transmission-set identifier.

42. The computer-readable medium of claim 41, comprising a hard drive, a CD disk, read only memory, or a floppy disk.

43. The computer-readable medium of claim 41, wherein the first session identifier comprises a name parameter and the first transmission-set identifier comprises a value parameter.

44. The computer-readable medium of claim 43, wherein the name parameter is derived by applying a transformation to some detail that is held by the host-computer and that is specific to the session.

45. The computer-readable medium of claim 43, wherein the value parameter comprises a pseudo-random value or a random value.

46. The computer-readable medium of claim 41, wherein the host-computer transmission comprises a web page.

47. The computer-readable medium of claim 41, wherein the responsive client transmission comprises a data field.

48. The computer-readable medium of claim 41, wherein an input field comprises the unique identifier.

49. The computer-readable medium of claim 41, wherein the host-computer comprises a network-based computer or workstation.

50. The computer-readable medium of claim 41, wherein the host-computer comprises an Internet server.

51. The computer-readable medium of claim 41, wherein the responsive client transmission is processed upon a match between the first unique identifier and the stored identifier.

* * * * *